3,165,228
BASE FOR PRESSURE VESSELS
Milton F. Kroesch, Waukesha, and Willert O. Kugler, Milwaukee, Wis., assignors to Pressed Steel Tank Company, Milwaukee, Wis., a corporation of Wisconsin
Filed Feb. 5, 1962, Ser. No. 171,133
3 Claims. (Cl. 220—69)

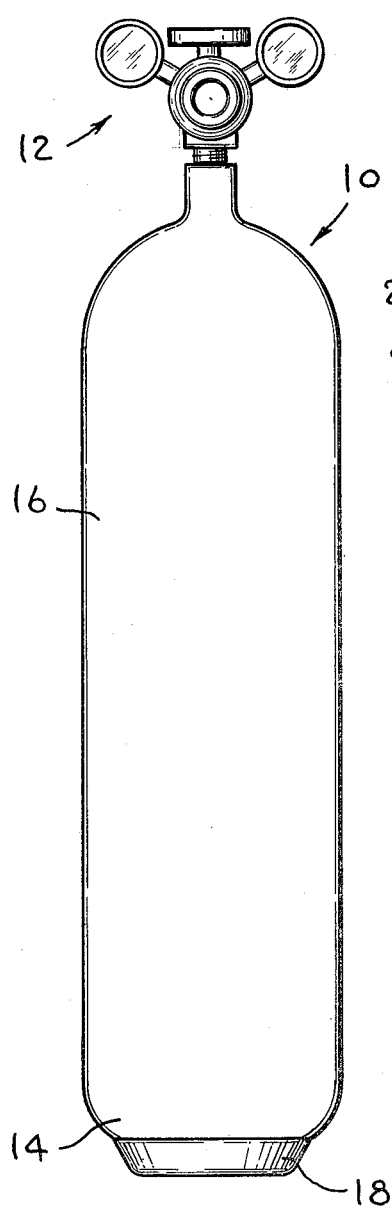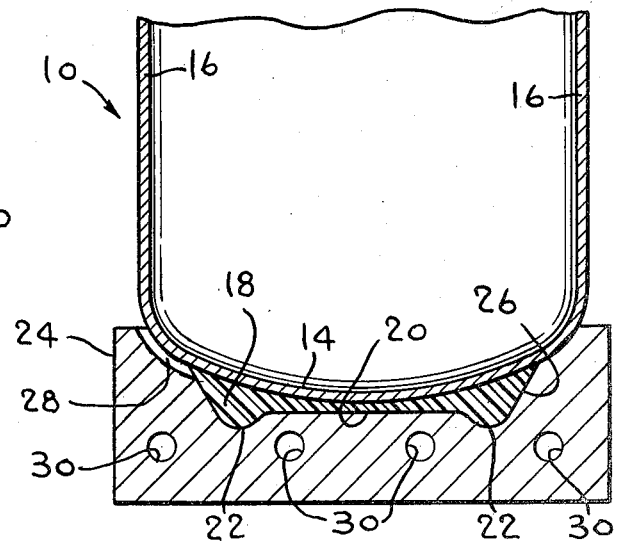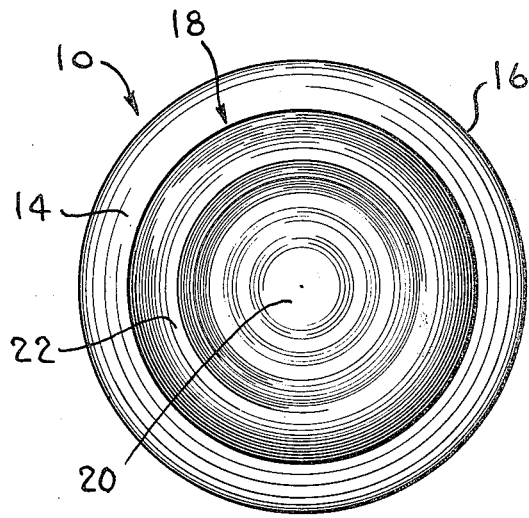

This invention relates to pressure vessels and, more particularly, to a pressure vessel having a plastic supporting base and a method of attaching the plastic base to the pressure vessel.

In the design of pressure vessels, where it is well known that an ellipsoidal configuration is most effective for withstanding pressures, pressure considerations have partially given way to another design consideration, that being to provide a pressure vessel which will be self-supporting and stand upright. Heretofore, the general practice has been to provide pressure vessels with what is known in the art as a "bumped-back" bottom, e.g. a concave central portion with an annular supporting ridge or an undulating-type bottom having a plurality of support feet arranged in a clover-leaf design. "Bumped-back" bottoms are effective for standing the vessel upright, but obviously they are not the most efficient from a pressure standpoint and have required heavier gage bottoms, as compared to the walls of the vessel, to withstand pressure. Further, "bumped-back" bottoms involve additional fabricating steps which increase their cost of manufacture; they afford no corrosion protection for the vessel bottom; and, where explosive or flammable gases are handled (e.g. hospital operating rooms), extreme care must be taken to prevent sparking due to engagement with other metallic structures.

In accordance with this invention a pressure vessel is provided with a plastic base having a configuration suitable for supporting the pressure vessel in an upright position. In accordance with another aspect of this invention, the plastic support base is molded to the bottom of the pressure vessel so that the base virtually becomes an integral part of the vessel.

Accordingly, a general object of this invention is to provide a suitable support for a pressure vessel which will have none of the shortcomings discussed above with regard to "bumped-back" bottoms.

A more specific object of this invention is to provide a support base for a pressure vessel which allows the pressure vessel to have a bottom configuration which is most efficient from a pressure standpoint.

Still more specific objects of this invention are to provide a plastic base for a pressure vessel which will protect the vessel bottom from corrosion; will be adherently attached to the vessel bottom; will minimize the danger of sparking; and which will reduce noise and act as a shock absorber.

Further objects of this invention are to provide a method of attaching a plastic base to the bottom of a pressure vessel in a simplified and efficient manner, and one whereby the base is adherently and permanently attached to the vessel bottom.

The novel features of this invention are set forth in the appended claims. The invention itself, together with additional objects and advantages thereof, will be more clearly understood from a reading of the following description in connection with the accompanying drawings wherein a preferred embodiment of the invention has been illustrated and in which:

FIG. 1 is a front elevation;

FIG. 2 is a sectional view through the bottom portion of the pressure vessel and illustrating the preferred method of attaching the base to a pressure vessel; and FIG. 3 is a bottom plan view.

With reference to the drawings, a pressure vessel 10 includes top mounted flow control means 12, a bottom 14 and side walls 16. A support base 18 is attached to bottom 14 and includes a web portion 20 and an annular ring 22 which extends around the periphery of and to a point below web 20 to provide a stable support for pressure vessel 10. Base 18 performs the support function for the pressure vessel thereby permitting bottom 14 to have an ellipsoidal configuration which, since this configuration is most efficient from a pressure point, allows the thickness of bottom 14 to be no greater than the thickness of walls 16 thereby providing, in comparison to "bumped-back" bottoms, a more efficient and yet more economical structure in that less material is required and it is easier to fabricate.

Support base 18 is preferably made of a suitable thermoplastic material such as polyvinyl chloride which is rigid, not unduly affected by moisture, and has a relatively long life, as compared to materials such as rubber, and should therefore have a useful life at least equal to that of vessel 10. Such thermoplastic materials are not limited to applications where they would be exposed only to relatively low temperatures and, further, are not adversely affected by aging in that they maintain their characteristics over a long period of time. Furthermore, the use of plastic for base 18 has a further advantage in that it can be adherently attached to bottom 14 without the need for any localized heating of the bottom, e.g. it need not be welded to the bottom as would a metal base; in this regard it should be kept in mind that, being a pressure vessel, vessel 10 cannot have any welds thereon.

Support base 18 holds bottom 14 away from any moisture which might be on the flooring upon which the vessel is resting and, further, web 20 and ring 22 completely cover the lowermost portion of bottom 14 thereby providing adequate corrosion protection.

Base 18 may be attached to bottom 14 through use of a suitable adhesive. In using an adhesive, care must be taken to provide an evenly distributed film between the bottom and the base to insure complete attachment without voids. However, regardless of the care taken in applying the adhesive the danger always exists that an evenly distributed film may not be provided or that the adhesive will not stick properly thereby forming voids between the base and bottom. Accordingly, molding base 18 directly to the vessel bottom is preferred as this provides complete intimate engagement with the vessel bottom eliminating the danger of the occurrence of voids.

To mold base 18 to bottom 14 it is proposed to provide a mold 24 having a cavity 26 forming the female portion of the mold and to use the bottom 14 of vessel 10 as the male portion of the mold. More particularly, a predetermined measured quantity of resin is placed in the mold and the mold is heated, for example by passing a suitable medium through tubes 30. The particular temperature to which the mold is raised is dictated by the resin being used, in the case of polyvinyl chloride that temperature is approximately 300° F. to 350° F. The plastic then flows into contact with and adheres to the bottom 14. If desired an opening, or openings, 28 can be provided in the mold to allow any excess plastic to flow from the mold and also to permit air to escape therefrom so that no air is entrapped between the base and the bottom 14. The plastic is allowed to cure and adhere securely to the bottom 14 and, when cooled to room temperature, vessel 10 with its molded-on base is removed from the mold. Preparatory to molding, bottom 14 should be free of foreign matter to insure intimate adherence of the plastic.

To insure a long-lasting and adherent bond between base 18 and bottom 14, we propose to pre-treat the outer surface of bottom 14 prior to molding. Preferably, a suitable primer is applied to the outer surface of bottom 14. The particular primer to be used is dictated by the thermoplastic material of the base as it and the primer must be compatible. Where base 18 is made of polyvinyl chloride a suitable polyvinyl primer is used, such as "Polyclutch" primer a commercially available product. The primer etches into the metal bottom, receives the polyvinyl chloride and forms a bond between the base and bottom. The pre-treatment of bottom 14 provides means on the vessel bottom for receiving the plastic base 18 and which in the completed vessel forms an adherent bond at the interface of base 18 and bottom 14. With this method of attachment base 18 becomes virtually an integral part of vessel 10 and provides adequate corrosion protection in that, for all practical purposes, it completely seals bottom 14 from moisture.

The use of the primer is an example of forming a chemical bond between the base and bottom, other methods of pre-treating the vessel bottom to provide means for receiving the plastic base and for providing a bond at the interface between the base and the bottom can be utilized. For example, a mechanical bond can be provided by sand blasting bottom 14 prior to molding. This cleans the outer surface of bottom 14 and provides a number of minute key-lock portions (not shown) into which plastic is received. The plastic cures in and around the key-lock portions thereby providing extremely adherent engagement over the entire contact surface between base 18 and bottom 14, again providing an adherent bond at the interface of the base and bottom.

The exact structural arrangement of both chemical and mechanical bonds discussed above have not been illustrated since they are only visible under microscopic examination and should be readily understood by those skilled in the art.

The discussion and illustration of this invention in relation to a particular preferred embodiment thereof has been intended for illustrative purposes only and should not be taken by way of limitation. Accordingly, it is intended in the appended claims to cover all modifications and embodiments of this invention as fall within the true spirit and scope thereof.

What we claim is:

1. A metal pressure vessel having an outwardly convex bottom the external surface of which is characterized by an etched portion, a bottom member comprising a generally circular disk of polyvinyl chloride plastic conforming with and attached to said etched portion of said convex bottom, the interface between said convex bottom and said disk characterized by portions of said plastic bottom member intermingled with said convex bottom, and a polyvinyl primer dispersed therethrough to form an adherent, interlocking bond between said bottom member and said convex bottom, said plastic bottom member covering substantially the entire bottom area of said vessel and being provided with axially projecting support means arranged generally concentric with the longitudinal axis of said cylinder and defining a planar supporting surface lying in a plane substantially perpendicular to the longitudinal axis of said vessel.

2. A metal pressure vessel having an outwardly convex bottom the external surface of which is characterized by an etched portion resulting from the application thereto of a polyvinyl etching primer, a bottom member comprising a generally circular disk of polyvinyl chloride plastic conforming with and attached to said etched portion of said convex bottom, the interface between said convex bottom and said disk characterized by portions of said plastic bottom member intermingled with said convex bottom, with said polyvinyl etching primer dispersed therethrough to form an adherent, interlocking bond between said bottom member and said convex bottom, said plastic bottom member covering substantially the entire bottom area of said vessel and being provided with axially projecting support means arranged generally concentric with the longitudinal axis of said cylinder and defining a planar supporting surface lying in a plane substantially perpendicular to the longitudinal axis of said vessel.

3. A high pressure metal gas cylinder having an outwardly convex bottom, the external surface of which is provided with a multiplicity of cavities resulting from the application thereto of a polyvinyl etching primer, a polyvinyl chloride bottom member comprising a circular disk of polyvinyl chloride plastic having a recess in one face thereof, the surface of which is conformed to the convex bottom of the cylinder and is in surface contact therewith and is attached thereto by means including a multiplicity of polyvinyl keys interlocked with the etched cavities in the bottom of the cylinder, said polyvinyl disk covering substantially the entire bottom area of the cylinder and being provided with an axially projecting supporting circular rib concentric with the longitudinal axis of the cylinder, the body of the disk circumscribed by said circular rib being recessed, said circular rib defining a coplanar supporting surface lying in a plane substantially perpendicular to the longitudinal axis of the cylinder.

References Cited in the file of this patent
UNITED STATES PATENTS

| | | |
|---|---|---|
| 1,985,558 | Alexander | Dec. 25, 1934 |
| 2,016,171 | Matter | Oct. 1, 1935 |
| 2,033,643 | Neill | Mar. 10, 1936 |
| 2,067,581 | Smith | Jan. 12, 1937 |
| 2,720,479 | Crawford et al. | Oct. 11, 1955 |
| 2,847,144 | Cornelius | Aug. 12, 1958 |
| 2,872,068 | Johnson | Feb. 3, 1959 |
| 2,951,612 | Salzenbrodt | Sept. 6, 1960 |
| 2,956,915 | Korn et al. | Oct. 18, 1960 |
| 3,004,298 | Haynie | Oct. 17, 1961 |